(12) United States Patent (10) Patent No.: US 8,938,607 B2
Gee et al. (45) Date of Patent: Jan. 20, 2015

(54) DATA PACKET ARITHMETIC LOGIC DEVICES AND METHODS

(71) Applicant: Intel Corporation, Santa Clara, CA (US)

(72) Inventors: Corey Gee, Fremont, CA (US); Bapiraju Vinnakota, Fremont, CA (US); Saleem Mohammadali, Karnataka (IN); Carl A. Alberola, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/927,036

(22) Filed: Jun. 25, 2013

(65) Prior Publication Data

US 2013/0290684 A1  Oct. 31, 2013

Related U.S. Application Data

(63) Continuation of application No. 11/591,108, filed on Oct. 31, 2006, now Pat. No. 8,473,719, which is a continuation of application No. 10/602,349, filed on Jun. 23, 2003, now Pat. No. 7,139,900.

(51) Int. Cl.
*G06F 9/302* (2006.01)
*G06F 9/30* (2006.01)
*G06F 9/38* (2006.01)

(52) U.S. Cl.
CPC .......... *G06F 9/3001* (2013.01); *G06F 9/30036* (2013.01); *G06F 9/30014* (2013.01); *G06F 9/30018* (2013.01); *G06F 9/3885* (2013.01)

USPC .......................................... 712/221

(58) Field of Classification Search
CPC ... G06F 9/261; G06F 9/3001; G06F 9/30036; G06F 9/30145
USPC ......................... 712/210, 211, 221
See application file for complete search history.

(56) References Cited

U.S. PATENT DOCUMENTS 4,325,120 A 4/1982 Colley et al.
4,338,675 A 7/1982 Palmer et al.
(Continued)

FOREIGN PATENT DOCUMENTS

EP 362580 A2 * 4/1990 ............... G06F 5/01
EP 0395348 10/1990
(Continued)

OTHER PUBLICATIONS

Wagner, J. , et al., "C Compiler Design for a Network Processor", *IEEE* Transactions on Computer-Aided Design of Integrated Circuits and Systems, vol. 20, No. 11, (Nov. 2001), 1302-1308.
(Continued)

*Primary Examiner* — Aimee Li
(74) *Attorney, Agent, or Firm* — Vecchia Patent Agent, LLC

(57) ABSTRACT

New instruction definitions for a packet add (PADD) operation and for a single instruction multiple add (SMAD) operation are disclosed. In addition, a new dedicated PADD logic device that performs the PADD operation in about one to two processor clock cycles is disclosed. Also, a new dedicated SMAD logic device that performs a single instruction multiple data add (SMAD) operation in about one to two clock cycles is disclosed.

29 Claims, 10 Drawing Sheets

(56) References Cited

U.S. PATENT DOCUMENTS

| | | | |
|---|---|---|---|
| 4,393,457 | A | 7/1983 | New |
| 4,415,969 | A | 11/1983 | Bayliss et al. |
| 4,491,932 | A * | 1/1985 | Ruhman et al. ............... 382/131 |
| 4,908,874 | A | 3/1990 | Gabriel |
| 5,047,975 | A | 9/1991 | Patti et al. |
| 5,241,636 | A | 8/1993 | Kohn |
| 5,542,033 | A * | 7/1996 | Dao-Trong et al. ............. 714/10 |
| 5,560,039 | A | 9/1996 | Dulong et al. |
| 5,740,392 | A | 4/1998 | Brennan |
| 5,778,246 | A | 7/1998 | Brennan |
| 5,784,307 | A | 7/1998 | Sheaffer |
| 5,793,661 | A | 8/1998 | Dulong et al. |
| 5,838,960 | A | 11/1998 | Harriman |
| 5,983,257 | A | 11/1999 | Dulong |
| 5,996,066 | A | 11/1999 | Yung |
| 6,014,735 | A | 1/2000 | Chennupaty et al. |
| 6,047,304 | A | 4/2000 | Ladwig et al. |
| 6,058,410 | A | 5/2000 | Sharangpani |
| 6,073,154 | A | 6/2000 | Dick |
| 6,115,812 | A | 9/2000 | Abdallah |
| 6,141,673 | A | 10/2000 | Thayer et al. |
| 6,202,077 | B1 | 3/2001 | Smith |
| 6,211,892 | B1 | 4/2001 | Huff et al. |
| 6,212,618 | B1 | 4/2001 | Roussel |
| 6,212,628 | B1 * | 4/2001 | Abercrombie et al. ....... 712/226 |
| 6,317,822 | B1 | 11/2001 | Padwekar |
| 6,349,318 | B1 | 2/2002 | Vanstone et al. |
| 6,418,529 | B1 | 7/2002 | Roussel |
| 6,530,061 | B1 | 3/2003 | Labatte |
| 6,629,115 | B1 | 9/2003 | Rossignol |
| 6,643,765 | B1 | 11/2003 | Hansen et al. |
| 6,745,319 | B1 | 6/2004 | Balmer et al. |
| 6,766,344 | B2 | 7/2004 | Dubey et al. |
| 6,859,815 | B2 | 2/2005 | Krishnamachari et al. |
| 6,862,278 | B1 * | 3/2005 | Chang et al. ................... 370/389 |
| 6,973,470 | B2 | 12/2005 | Takahashi et al. |
| 6,976,049 | B2 | 12/2005 | Sheaffer |
| 7,085,795 | B2 | 8/2006 | Debes et al. |
| 7,162,607 | B2 | 1/2007 | Macy et al. |
| 7,190,667 | B2 | 3/2007 | Susnow et al. |
| 7,310,337 | B2 | 12/2007 | Katti et al. |
| 7,343,389 | B2 | 3/2008 | Macy et al. |
| 7,492,710 | B2 | 2/2009 | Wadekar et al. |
| 7,768,518 | B2 | 8/2010 | Collins et al. |
| 7,949,130 | B2 | 5/2011 | Gueron et al. |
| 2001/0016902 | A1 | 8/2001 | Abdallah et al. |
| 2004/0193847 | A1 | 9/2004 | Lee et al. |

FOREIGN PATENT DOCUMENTS

| | | | |
|---|---|---|---|
| EP | 735711 A1 * | 10/1996 | ............... H04L 1/00 |
| WO | WO-97/08608 | 3/1997 | |

OTHER PUBLICATIONS

Andrew S. Tannenbaum, "Structured Computer Organization", 2$^{nd}$ Edition, 1984, Prentice Hall, pp. 10-12 and 204-221.

Stanislaw J. Piestrak, "Design of Residue Generators and Multioperand Modular Addres Using Carry-Save Adders", IEEE Transactions on Computers, vol. 323, No. 1, Jan. 1994, pp. 68-77.

* cited by examiner

Instruction Description

- PADD

Syntax: PADD  [-C][-M] RZ, RX, RY
        PADD  -I[-C][-M] RZ, RX, <UI8 :immediate>
        PADD  -N[-C][-M] RZ, RX, RY, <UI5 : start>, <UI5 : stop>
        PADD  -N-I[-C][-M] RZ, RX, <UI8 : immediate>, <UI5 : start>

RX, RY are the source data registers
RZ is the destination register
<UI8: immediate> specifies the value of an immediate operand
<UI5: start> specifies start of bit field to be modified
<UI5: stop> specifies end of bit field to be modified
-C indicates addition with carry in
-M indicates addition modulo $2^n - 1$
-N indicates that addition affects only a bit field
-I indicates that second operand is supplied as an immediate value

FIG. 2A

| Option Used | Operation |
|---|---|
| PADD RZ, RX, RY | RZ = RX + RY |
| PADD -C RZ, RX, RY | RZ = RX + RY + Cin |
| PADD -I RZ, RX, <U18: Immediate> | RZ = RX + <immediate> |
| PADD -N RZ, RX, RY, <UI5: Start>, <UI5: stop> | RZ = { RX[31:stop], (RX[stop:start] + RY[length]) + RX[start:0]) modulo $2^{length}$ }<br>Where length = stop - start + 1 |
| PADD -M RZ, RX, RY | RZ = (RX + RY) modulo $2^n$ - 1 |
| PADD -N -I RZ, RX, <UI8: immediate>, <UI5: start> | RZ = { (RX[31:start], + immediate[31-start: 0]) modulo $2^{31\text{-}start+1}$, RX[start: 0] }<br>In this case, a stop is assumed to be 31. |

FIG. 2B

SMAD

Syntax: SMAD [-A] [-M] RZ, RX, RY, <UI2: Length>, <UI2: Num Ops>

RZ is the destination register

RX and RY are source data registers

-A option is used to accumulate results where RZ is used as the accumulator

-M option results in a modulo $2^n - 1$ addition

<UI2: Length> indicates the data widths

0: 8 bit operands, where each register is assumed to contain 4 8-bit operands

1: 16 bit operands, where each register is assumed to contain 2 16-bit operands

2: 32 bit operands

3: unused

<UI2: Num Ops> indicates the number of operands to be used in the addition

0: 2 source operands RX and RY

1: 3 source operands RX, RX+1 and RY

2: 3 source operands RX, RY and RY+1

3: 4 source operands RX, RY, RX+1 and RY+1

FIG. 3A

| Option Used | Operation |
|---|---|
| SMAD RZ, RX, RY, 2, 0 | RZ = RZ + RX + RY |
| SMAD -A RZ, RX, RY, 2, 0 | RZ = RX + RY + (RX+1) + (RY+1) |
| SMAD RZ, RX, RY, 2, 3 | RZ = RX[7:0] + RX[15:8] + RX[23:16] + RX[31:24] + RY[7:0] + RY[15:8] + RY[23:16] + RY[31:24] |
| SMAD RZ, RX, RY, 0, 0 | RZ = (RX + RY) modulo $2^n - 1$ |
| SMAD -M RZ, RX, RY, 2, 0 | |
| SMAD -A -M RZ, RX, RY, 2, 0 | RZ = (RZ + RX + RY) modulo $2^n - 1$ |

FIG. 3B

| m + n | mask (32b) | $\overline{\text{mask}}$ (32b) |
|---|---|---|
| 0: 00000 | 1111...1110 | 0000...0001 |
| 1: 00001 | 1111...1100 | 0000...0011 |
| 2: 00010 | 1111...1000 | 0000...0111 |
| ⋮ | ⋮ | ⋮ |
| 30: 1_1110 | 1000...0000 | 0111...1111 |
| 31: 1_1111 | 0000...0000 | 1111...1111 |

FIG. 6

| Carry bits of special consideration in "32-b CSA" | | | |
|---|---|---|---|
| carry bit | output from | input to | not propagated for modulo $2^n$ addition, n=? |
| c[8] | 702-7 | 704-8 | 8 |
| co_8 | 702-7 | 702-8 | 8 |
| c[16] | 702-15 | 704-0 | 8, 16 |
| co_16 | 702-15 | 702-16 | 8, 16 |
| c[24] | 702-23 | 704-8 | 8 |
| co_24 | 702-23 | 702-24 | 8 |
| c[32] | 702-31 | 708 | 8, 16, 32 |
| co_32 | 702-31 | 702-0 | 8, 16, 32 |

FIG. 11

| Carry bits of special consideration in "16-b CSA" | | | |
|---|---|---|---|
| carry bit | output from | input to | not propagated for modulo $2^n$ addition, n=? (n = 32 not applicable) |
| c[8] | 704-7 | 706-0 | 8 |
| co1_8 | 704-7 | 704-8 | 8 |
| c1[16] | 704-15 | 704-0 | 8, 16 |
| co1_16 | 704-15 | 704-0 | 8, 16 |

FIG. 12

| Carry bits of special consideration in "8-b CSA" | | | |
|---|---|---|---|
| carry bit | output from | input to | not propagated for modulo $2^n$ addition, n=? (n = 32, 16 not applicable) |
| c2[8] | 706-7 | 706-0 | 8 |
| co2_8 | 706-7 | 706-0 | 8 |

FIG. 13

DATA PACKET ARITHMETIC LOGIC DEVICES AND METHODS

The present application is a continuation of U.S. patent application Ser. No. 11/591,108, filed on Oct. 31, 2006, entitled "DATA PACKET ARITHMETIC LOGIC DEVICES AND METHODS", now U.S. Pat. No. 8,473,719, which claims priority to U.S. patent application Ser. No. 10/602,349, filed on Jun. 23, 2003, entitled "DATA PACKET ARITHMETIC LOGIC DEVICES AND METHODS", now U.S. Pat. No. 7,139,900. U.S. patent application Ser. Nos. 11/591,108 and 10/602,349 are hereby incorporated herein by reference.

FIELD

This disclosure relates generally to data packet manipulation, and specifically, to new instruction definitions for a packet add (PADD) operation and for a single instruction multiple add (SMAD) operation, to a new PADD logic device that performs the PADD operation, and to a new SMAD logic device that performs the SMAD operation.

BACKGROUND

Many applications require the manipulation of data residing in data packets. For instance, packet processing in voice applications require the manipulation of several layers of protocol headers and several types of protocols. Also, protocols such as Internet Protocol (IP), Asynchronous Transfer Mode (ATM), and ATM adaptation layers (AALs) require header manipulation and error detection.

In the prior art, reduced instruction set computation (RISC) processors are used to perform manipulation of packet data. However, processors typically require many clock cycles to perform complex data manipulation. In addition, because processors typically operate on fixed length words, some inefficiencies result when the data to be manipulated is less than or more than the length of the word.

BRIEF DESCRIPTION OF THE DRAWINGS

FIG. 2A illustrates an exemplary syntax for an instruction to perform a packet addition (PADD) in accordance with another embodiment of the invention;

FIG. 2B illustrates various examples of PADD instructions in accordance with another embodiment of the invention;

FIG. 3A illustrates an exemplary syntax for an instruction to perform a single multiple data add (SMAD) in accordance with another embodiment of the invention;

FIG. 3B illustrates various examples of SMAD instructions in accordance with another embodiment of the invention;

FIG. 6 illustrates a table listing of exemplary 32-bit length masks used in the exemplary PADD logic device that performs the PADD function in accordance with another embodiment of the invention;

FIG. 11 illustrates an exemplary table illustrating an aspect of the operation of the 32-bit CSA in accordance with an embodiment of the invention;

FIG. 12 illustrates an exemplary table illustrating an aspect of the operation of the 16-bit CSA in accordance with an embodiment of the invention; and FIG. 13 illustrates an exemplary table illustrating an aspect of the operation of the 8-bit CSA in accordance with an embodiment of the invention.

DETAILED DESCRIPTION

I. Packet Arithmetic Logic Device

Figure 1:
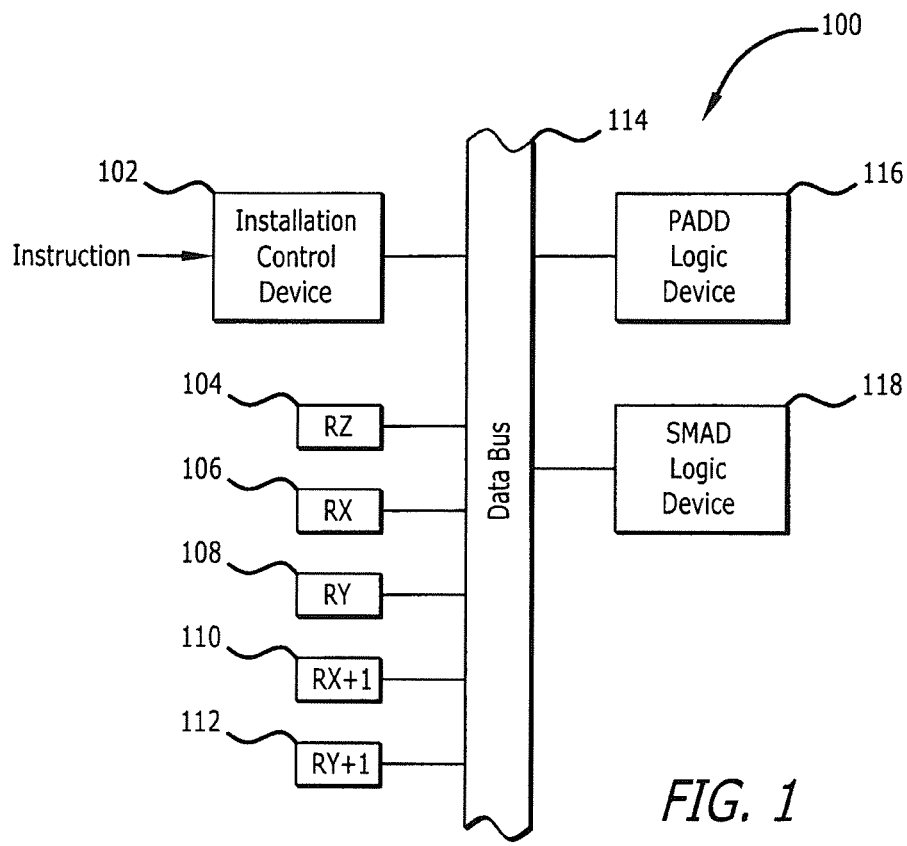
FIG. 1 illustrates a block diagram of an exemplary packet arithmetic logic device in accordance with an embodiment of the invention.

FIG. 1 illustrates a block diagram of an exemplary packet arithmetic logic device 100 in accordance with an embodiment of the invention. The packet arithmetic logic device 100 performs various operations on data packets. Such operations include packet processing for voice applications which require the manipulation of several layers of protocol headers and several types of protocols, and header manipulation and error detection especially in complex protocols such as Internet protocol (IP), asynchronous transfer mode (ATM), and ATM adaptation layers (AALs). The packet arithmetic logic device 100 performs these operations in substantially less clock cycles than the prior art processors which take a multitude of steps to achieve these operations.

The packet arithmetic logic device 100 comprises an instruction control device 102, a result register RZ 104, a plurality of source data registers RX 106, RY, 108, RX+1 110, and RY+1 112, a data bus 114, a packet add (PADD) logic device 116, and a single instruction multiple data add (SMAD) logic device 118. The instruction control device 102 receives, interprets, and controls the registers and logic devices to properly execute the instruction. The result data register RZ 104 stores the result of the packet arithmetic operations. The source data registers RX 106, RY, 108, RX+1 110, and RY+1 112 store the various operands for the packet arithmetic operations. The PADD logic device 116 performs a packet add operation in about one to two clock cycles. The SMAD logic device 118 performs a multiple data add operation in about one to two clock cycles.

The following provides various instruction definitions which the packet arithmetic logic device 100 interprets in performing the specified packet arithmetic operations.

II. Arithmetic Instructions for Packet Processing

II-A. PADD Instruction

FIG. 2A illustrates an exemplary syntax for an instruction 200 to perform a packet addition (PADD) in accordance with another embodiment of the invention. In a PADD function, at least a portion of an operand packet X stored in register RX is added with at least another portion of an operand packet Y stored in register RY or an immediate operand to form a result packet Z stored in result register RZ. Optionally, a carry in bit, set by a previous instruction, may be used as a third operand in the addition.

The PADD instruction 200 defines the result register RZ and one or two source registers RX and RY. The PADD instruction 200 may also define an immediate value as an operand and designated in the instruction as <UI8: immediate>. The PADD instruction 200 may further define the start bit and stop bit of the data field to be modified. These are respectively designated as <UI5: start> and <UI5: stop>. The PADD instruction 200 may also include several control parameters, including a control parameter designated as [−C] to indicate an addition with a carry in, a control parameter designated as [−M] to indicate a modulo $2^n1$ addition, a control parameter designated as −N to indicate an addition affecting only the specified data field, and a control parameter designated as −I to indicate that the second operand is supplied as an immediate value.

FIG. 2B illustrates various examples of PADD instructions 250 in accordance with another embodiment of the invention. In the first example instruction:

PADD RZ, RX, RY the instruction control device 102 causes the PADD logic device 116 to add the operand X stored in the source register RX 106 to the operand Y stored in the source register RY 108, and place the result Z in the result register RZ 104 (i.e. RZ=RX+RY).

In the second example instruction:

PADD −C RZ, RX, RY the instruction control device 102 causes the PADD logic device 116 to add the operand X stored in the source register RX 106, the operand Y stored in the source register RY 108, and the carry in from a previous instruction, and place the result Z in the result register RZ 104 (i.e. RZ=RX+RY+Cin).

In the third example instruction:

PADD −I RZ, RX, <UI8: immediate> the instruction control device 102 causes the PADD logic device 116 to add the operand X stored in the source register RX 106 to an immediate value specified in <UI8: immediate>, and place the result Z in the result register RZ 104 (i.e. RZ=RX+<immediate>).

In the fourth example instruction:

PADD −N RZ, RX, RY <UI5: start>, <UI5: stop> the instruction control device 102 causes the PADD logic device 116 to add the data field beginning at the start bit and ending at the stop bit of operand X stored in the source register RX 106 to the data field beginning at the least significant bit and having a length defined as stop-start+1 in the operand Y stored in the source register RY 108, and place the result data field in the same bit position defined by the start and stop in the result Z stored in the result register RZ. The remaining data fields of operand X stored in source register RX 106 outside of the specified data field are copied bitwise to the result Z stored in result register RZ. (i.e. RZ={RX[31:stop], (RX[stop:start]+RY[length]) modulo $2^{length}$, RX[start:0]}).

In the fifth example instruction:

PADD −M RZ, RX, RY the instruction control device 102 causes the PADD logic device 116 to modulo $2^n-1$ add the operand X stored in the source register RX 106 to the operand Y stored in the source register RY 108, and place the result Z in the result register RZ 104 (i.e. RZ=(RX+RY) modulo $2^n-1$).

In the sixth example instruction:

PADD −N −I RZ, RX, <UI8:immediate>, <UI5: start> the instruction control device 102 causes the PADD logic device 116 to add the data field beginning at the start bit and ending at the most significant bit of operand X stored in the source register RX 106 to the data field beginning at the least significant bit and ending at the bit 31—start bit of the immediate value, and place the result data field in the same bit position defined by the start and most significant bit of the result Z stored in the result register RZ 104. The remaining data field of operand X stored in source register RX 106 outside of the specified field is copied bitwise to the result Z stored in result register RZ 104. (i.e. RZ={(RX[31:start]+immediate[31−start:0]) modulo $2^{31-start}+1$, RX[start:0]}).

II-B. SMAD Instruction

FIG. 3A illustrates an exemplary syntax for an instruction 300 to perform a single instruction multiple data add (SMAD) in accordance with another embodiment of the invention. In a SMAD function, multiple operands are added together. For instance, if 32-bit addition is to be performed, up to four 32-bit operands X, Y, X+1, and Y+1 stored respectively in registers RX 106, RY 108, RX+1 110, and RY+1 112 may be added to form result Z stored in result register RZ 104. If 16-bit addition is to be performed, up to eight 16-bit operands X[15:0], X[31:16], Y[15:0], Y[31:16], X+1[15:0], X+1[31:16], Y+1[15:0], and Y+1 [31:16] stored respectively as pairs in registers RX 106, RY 108, RX+1 110 and RY+1 112 may be added to form result Z stored in result register RZ 104. If 8-bit addition is to be performed, up to 16 8-bit operands X[7:0], X[15:8], X[23:16], X[31:24], Y[7:0], Y[15:8], Y[23:16], Y[31:24], X+1[7:0], X+1[15:8], X+1[23:16], X+1[31:24], Y+1[7:0], Y+1[15:8], Y+1 [23:16], Y+1[31:24] stored respectively as quads in registers RX 106, RY 108, RX+1 110 and RY+1 112 may be added to form result Z stored in result register RZ 104.

The SMAD instruction 300 defines the result register RZ and one or two source registers RX and RY. The SMAD instruction 300 may also include several control parameters, including a control parameter designated as [−A] to indicate that the result is accumulated into the result register RZ, and a control parameter designated as [−M] to indicate a modulo $2^n-1$ addition. The SMAD instruction 300 may also include a parameter designated as <U12: Length> that indicates the data width of the operands (e.g. 0 indicates 8-bit operand, 1 indicates 16-bit operands, and 2 indicates 32-bit operands). In addition, the SMAD instruction 300 may include a parameter designated as <U12: Num Ops> to indicate the number of operands to be used in the addition (e.g. 0 indicates two source operands RX and RY, 1 indicates three source operands RX, RX+1, and RY, 2 indicates three source operands RX, RY, and RY+1, and 4 indicates four operands RX, RY, RX+1, and RY+1).

FIG. 3B illustrates various examples of SMAD instructions 350 in accordance with another embodiment of the invention. In the first example instruction:

SMAD RZ, RX, RY, 2, 0 the instruction control device 102 causes the SMAD logic device 118 to add the 32-bit operand X stored in the source register RX 106 to the 32-bit operand Y stored in the source register RY 108, and place the result Z in the result register RZ 104 (i.e. RZ=RX+RY).

In the second example instruction:

SMAD −A RZ, RX, RY the instruction control device 102 causes the SMAD logic device 118 to add the 32-bit operand X stored in the source register RX 106, the 32-bit operand Y stored in the source register RY 108, and the 32-bit operand Z stored in the result register RZ 104, and place the result Z in the result register RZ 104 (i.e. RZ=RZ+RX+RY).

In the third example instruction:

SMAD RZ, RX, RY, 2, 3 the instruction control device 102 causes the SMAD logic device 118 to add the 32-bit operand X stored in the source register RX 106, the 32-bit operand Y stored in the source register RY 108, the 32-bit operand X+1 stored in the source register RX+1 110, and the 32-bit operand Y+1 stored in the source register RY+1 112, and place the result Z in the result register RZ 104 (i.e. RZ=RX+RY+RX+1+RY+1).

In the fourth example instruction:
SMAD RZ, RX, RY, 0, 0
the instruction control device 102 causes the SMAD logic device 118 to add the 8-bit operand X[7:0] stored in the source register RX[7:0] 106, the 8-bit operand X[15:8] stored in the source register RX[15:8] 106, the 8-bit operand X[23:16] stored in the source register RX[23:16] 106, the 8-bit operand X[31:24] stored in the source register RX[31:24] 106, the 8-bit operand Y[7:0] stored in the source register RY[7:0] 108, the 8-bit operand Y[15:8] stored in the source register RY[15:8] 108, the 8-bit operand Y[23:16] stored in the source register RY[23:16] 108, and the 8-bit operand Y[31:24] stored in the source register RY[31:24] 108, and place the result Z in the result register RZ 104 (i.e. RZ=RX[7:0]+RX[15:8] +RX[23:16]+RX[31:24]+RY[7:0]+RY[15:8]+RY[23:16]+RY[31:24]).

In the fifth example instruction:
SMAD –M RZ, RX, RY, 2, 0
the instruction control device 102 causes the SMAD logic device 118 to modulo 2–1 add the 32-bit operand X stored in the source register RX 106 to the 32-bit operand Y stored in the source register RY 108, and place the result Z in the result register RZ 104 (i.e. RZ=(RX+RY) modulo $2^n-1$).

In the sixth example instruction:
PADD –A –M RZ, RX, RY, 2, 0
the instruction control device 102 causes the SMAD logic device 118 to modulo $2^n-1$ add the 32-bit operand X stored in the source register RX 106, the 32-bit operand Y stored in the source register RY 108, and the 32-bit operand Z stored in the result register RZ 104, and place the result Z in the result register RZ 104 (i.e. RZ=(RZ+RX+RY) modulo $2^n-1$).

I. The PADD Logic Device

Figure 4:
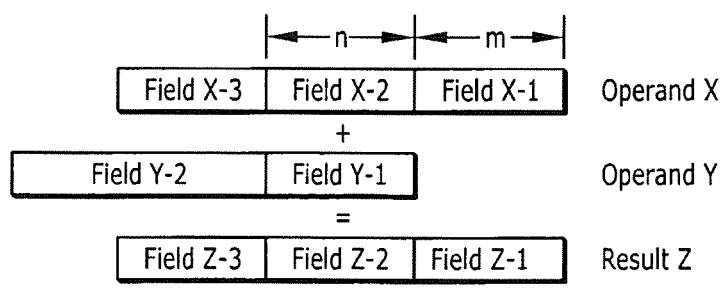
FIG. 4 illustrates diagrams of an exemplary pair of operand packets and a result packet undergoing a packet addition (PADD) function in accordance with another embodiment of the invention.

FIG. 4 illustrates diagrams of exemplary pair of operand packets and a result packet undergoing a packet addition (PADD) function in accordance with another embodiment of the invention. In a PADD function, an operand data field in an operand packet X is to be added with another operand data field in operand packet Y to form a data field in a result packet Z. The operand data field in the operand packet X has a length of n bits and its least significant bit is situated m bits from the least significant bit of the operand packet X. The operand data field in the operand packet Y also has a length of n bits and its least significant bit coincides with the least significant bit of the operand packet Y. The result data field in the result packet Z has a length of n bits and its least significant bit is situated m bits from the least significant bit of the operand packet Z. The remaining data fields in the operand packet X are copied bitwise to the result packet Z.

For example, operand data Field X-2 in operand packet X, which has a length of n bits and its least significant bit is situated m bits from the least significant bit of the operand packet X, is added to operand data Field Y-1 which also has a length of n bits and its least significant bit coincides with the least significant bit of the operand packet Y. The result data field Z-2, being the addition of Fields X-2 and Field Y-1, has a length of n bits and its least significant bit is situated m bits from the least significant bit of the operand packet Z. The remaining data Fields X-1 and X-3 in the operand packet X are copied bitwise to data Fields Z-1 and Z-3 of the result packet Z.

Figure 5:
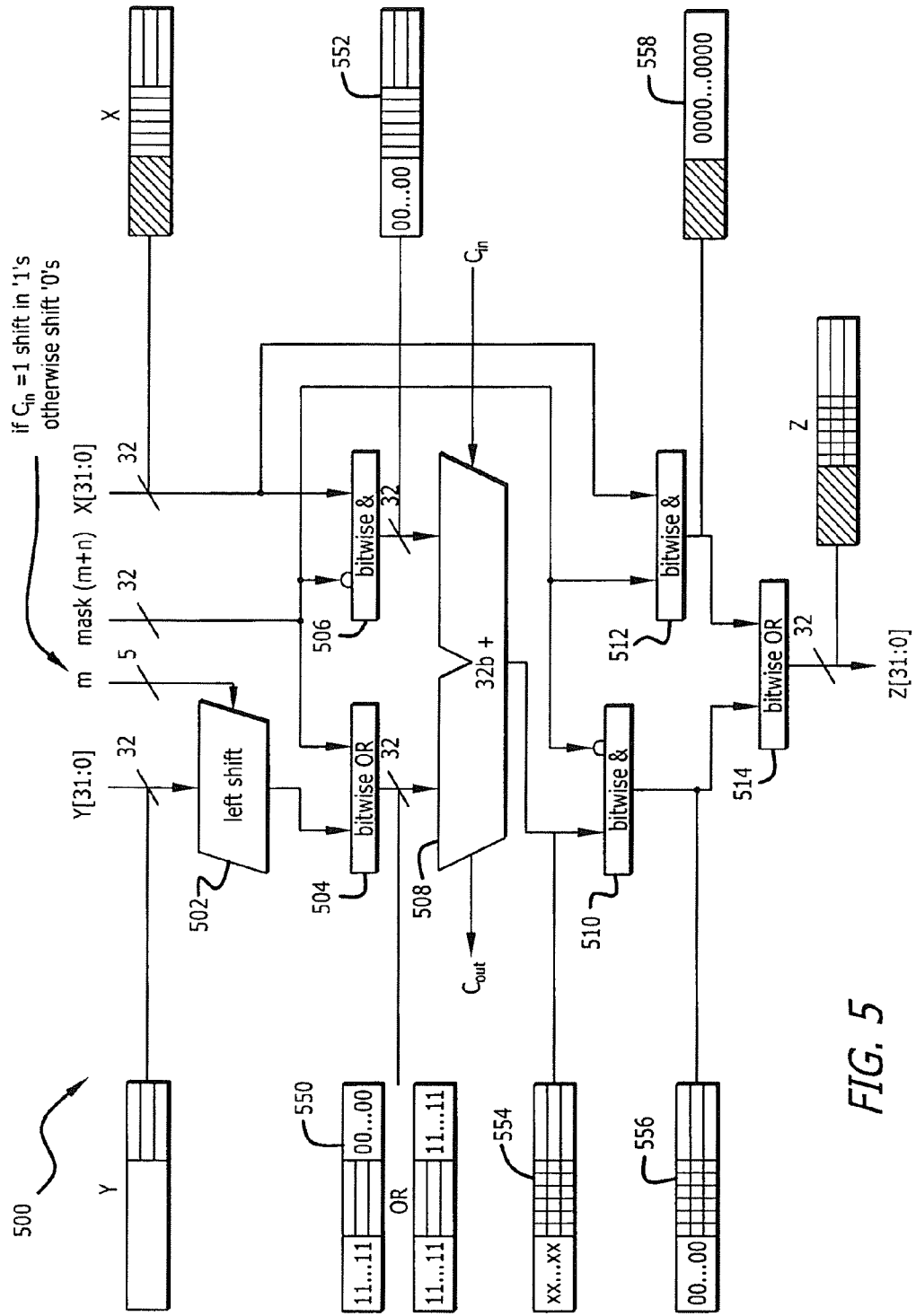
FIG. 5 illustrates a block diagram of an exemplary PADD logic device that performs the PADD function in accordance with another embodiment of the invention.

FIG. 5 illustrates a block diagram of an exemplary PADD logic device 500 that performs the PADD function in accordance with another embodiment of the invention. The PADD logic device 500 comprises a left shifter 502, bitwise logic ORs 504 and 514, bitwise logic ANDs 506, 510 and 512, and an adder 508. The operand Y is applied to the input of the left shifter 502 and the number m controls the amount of left shifting of the left shifter 502. The output of the left shifter 502 is applied to an input of the bitwise OR 504.

A mask (m+n) as listed in the table shown in FIG. 6 is applied to the other input of the bitwise OR 504, to an inverted input of bitwise AND 506, to an inverted input of bitwise AND 510, and to an input of bitwise AND 512. If the carry-in $C_{in}$ is 1, the left shifter 502 shifts in logic ones at its least significant bits, otherwise it shifts logic zeros. The operand X is applied to the respective inputs of the bitwise ANDs 506 and 512. The outputs of the bitwise OR 504 and bitwise AND 506 are applied to the inputs of adder 508. The output of the adder 508 is applied to the input of bitwise AND 510. The outputs of bitwise ANDs 510 and 512 are applied to the inputs of bitwise OR 514. And, the output of bitwise OR 514 generates the result packet Z.

The bitwise OR logic device 504 generates an intermediate packet 550 comprising the operand data Field Y-1 situated at the same bit position as the operand data Field X-1, with logic ones on the more significant bit side of the Field Y-1, and with either all logic ones if the carry-in $C_{in}$ is asserted or all logic zeros if the carry-in $C_{in}$ is not asserted on the lesser significant bit side of the Field Y-1. Thus, the following relationship holds for the output of the bitwise OR logic device 504:

Field X-3 Field X-2 Field X-1 Operand X
1 . . . 1 Field Y-1 0 . . . 0 Intermediate Packet 550 $C_{in}$=0
1 . . . 1 Field Y-1 1 . . . 1 Intermediate Packet 550 $C_{in}$=1

The intermediate packet 550 having logic ones at the same bit position as Field X-1 allows the carry-in to propagate to the sum field X+Y.

The bitwise AND logic device 506 generates an intermediate packet 552 which comprises logic zeros at the bit position of Field X-3 and Fields X-2 and X-1 at the same bit position as the corresponding Fields X-2 and X-1 of the operand packet X. Thus, the following relationship holds for the output of the bitwise AND logic device 506:

Field X-3 Field X-2 Field X-1 Operand X
0 . . . 0 Field X-2 Field X-1 Intermediate Packet 552

The output of the adder 508 generates an intermediate packet 554 which comprises don't cares x at the same bit position as Field X-3, the sum Field X+Y at the same bit position as Field X-2, and the Field X-1 at the same bit position as Field X-1. Thus, the following relationship holds for the output of the adder 508:

Field X-3 Field X-2 Field X-1 Operand X
x . . . x Field X+Y Field X-1 Intermediate Packet 554

The bitwise AND logic device 510 generates an intermediate packet 556 which comprises logic zeros at the same bit position as Field X-3, the sum Field X+Y at the same bit position as Field X-2, and the Field X-1 at the same bit position as Field X-1. Thus, the following relationship holds for the output of the bitwise AND logic device 510:

Field X-3 Field X-2 Field X-1 Operand X
0 . . . 0 Field X+Y Field X-1 Intermediate Packet 556

The bitwise AND logic device 512 generates an intermediate packet 558 which comprises Field X-3 at the same bit position as Field X-3 and logic zeros at the same bit position as Fields X-1 and X-2. Thus, the following relationship holds for the output of the bitwise AND logic device 512:

Field X-3 Field X-2 Field X-1 Operand X
Field X-3 Field 0 . . . 0 Intermediate Packet 558

The bitwise OR logic device 514 bitwise ORs the outputs of the bitwise AND logic device 510 and 512 to generate the result packet Z.

The following operand packets and result packet serves as an example to illustrate the operation of the PADD logic device 500:

0 . . . 111101101001101011010 Operand X
    0 . . . 00000000000000011001 Operand Y
    0 . . . 111101110110001011010 Result Z
    m=8, n=8, $C_{in}$=0

As discussed above, the operand Y is applied to the input of the left shifter 502, the number m controls the amount of left shifting, and the carry-in $C_{in}$ causes the left shifter 502 to shift in logic ones if it is asserted and logic zeros if it is not asserted. In this example, the number m is eight (8) and the $C_{in}$ is a logic zero (0). Therefore, the left shifter 502 left shifts the operand Y by eight (8) bits and shifts in logic zeros (0s). Accordingly, the output of the left shifter 502 is as follows:

0 . . . 00000001100100000000 (i.e. 0 . . . 000 Field Y-1 00000000)

Referring to both FIGS. 5 and 6, in this example the number (m+n) is equal to 16. Therefore, according to the table, the mask and its complement are given by the following:

mask=1 . . . 1110000000000000000
    complement mask=0 . . . 0001111111111111111

The output of the bitwise OR 504, being the bitwise OR of the output of the left shifter 502 and the mask, is given by the following:

1 . . . 111000001100100000000 (i.e. 1 . . . 111 Field Y-1 00000000)

The output of the bitwise AND 506, being the bitwise AND of the complement mask and the operand X, is given by the following:

0 . . . 000001101001101011010 (i.e. 0 . . . 000 Field X-2 Field X-1)

The outputs of the bitwise OR 504 and the bitwise AND 506 are summed by the adder 508. Since the carry-in $C_{in}$ is a logic zero, the output of the adder 508 is given by the following:

1 . . . 111111100100001011010 (i.e. 1 . . . 111 Field X+Y Field X-1)

The output of the adder 508 and the complement mask are bitwise AND by bitwise AND logic device 510. Therefore, the output of the bitwise AND logic device 510 is given by the following:

0 . . . 000001110010001011010 (i.e. 0 . . . 000 Field X+Y Field X-1)

The output of the bitwise AND 512, being the bitwise AND of the complement mask and the operand X, is given by the following:

0 . . . 1111000000000000000000 (i.e. Field X-3 0000000000000000)

The output of the bitwise OR logic device 514, which is the bitwise OR of the output of the bitwise AND logic devices 510 and 512, is given by the following:

0 . . . 111101110110001011010 (i.e. Field X-3 Field X+Y Field X-1)

which is the result packet Z.

An advantage of the PADD logic device 500 is that it performs the PADD operation relatively fast and efficient. In the prior art, RISC processors are employed to perform the PADD operation. However, RISC processors need to perform many logic operations to perform the PADD operation. This requires the RISC processors to take numerous clock cycles to perform the operation. With the PADD logic device 500, only one or two processor cycles are used to attain the PADD result.

II. Modulo $2^2$/Modulo $2^n$-1 Addition

Figure 7:
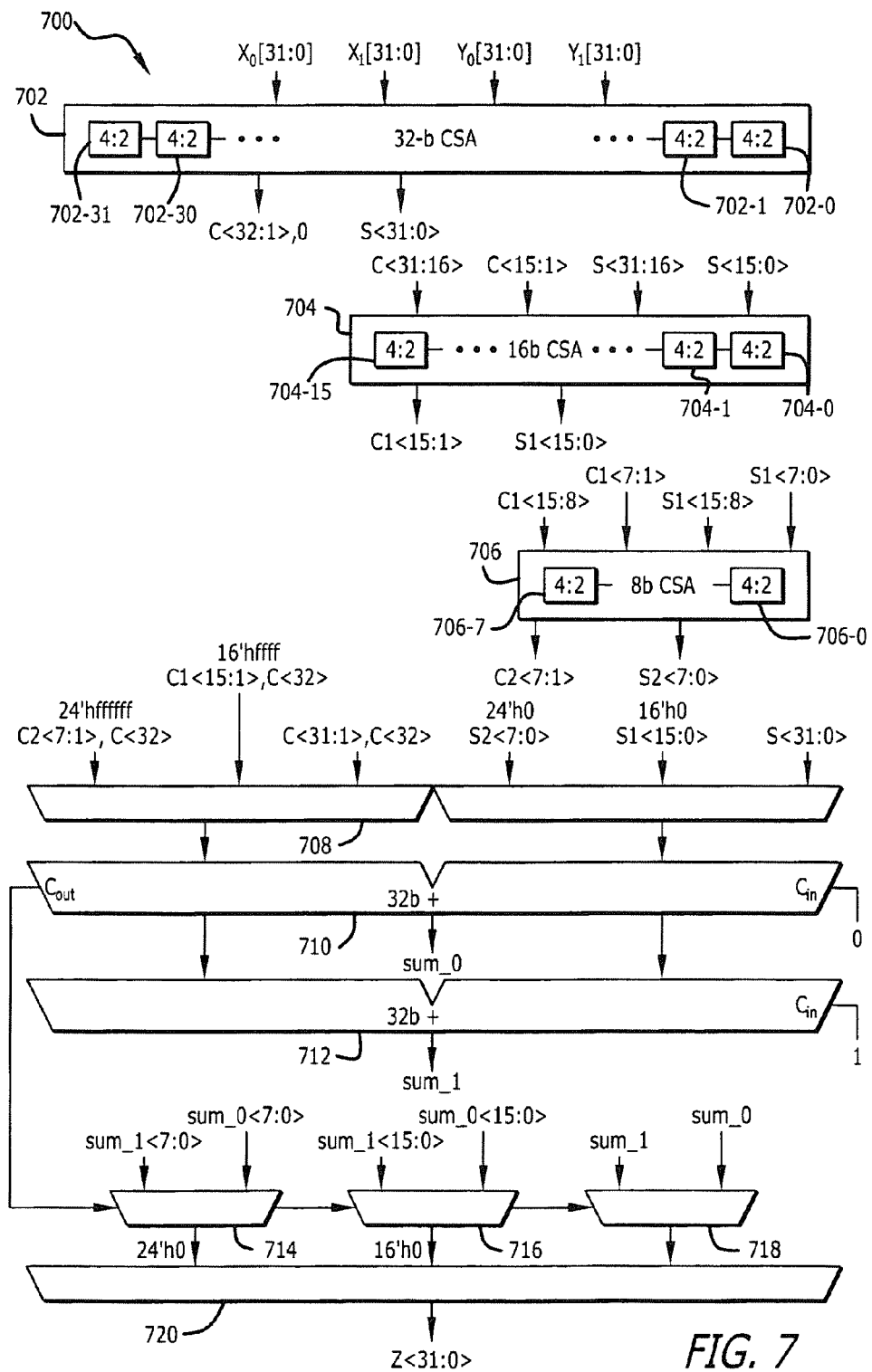
FIG. 7 illustrates a block diagram of an exemplary single multiple data add (SMAD) logic device in accordance with another embodiment of the invention.

FIG. 7 illustrates a block diagram of an exemplary single multiple data add (SMAD) logic device 700 in accordance with another embodiment of the invention. The SMAD logic device performs the modulo $2^n$ and/or the modulo $2^n-1$ of up to four 32-bit numbers, eight 16-bit numbers, or 16 8-bit numbers. The SMAD logic device 700 comprises a 32-bit carry-save adder (CSA) 702, a 16-bit CSA 704, and a 8-bit CSA 706. The SMAD logic device 700 further comprises a 6-input/2-output multiplexer 708, a first 32-bit adder 710, a second 32-bit adder 712, 2-input/1-output multiplexers 714, 716, and 718, and 3-input/1-output multiplexer 720.

The 32-bit CSA 702 receives up to four 32-bit operands $X_0[31:0]$, $X_1[31:0]$, $Y_0[31:0]$, and $Y_1[31:0]$, and generates a carry C<32:0> and a save S<31:0>. The 32-bit CSA 702 comprises 32 4:2 compressors 702-0 through 702-31. Each of the 4:2 compressors, represented as 702-n, receives as inputs $X_0[n]$, $X_1[n]$, $Y_0[n]$, and $Y_1[n]$, and generates the carry C<n> and save S<n>. The carry of compressor 702-n is allowed to carry to the first compressor 702-0 except under certain circumstances with regard to modulo $2^n$ addition, as will be explained further below.

The 16-bit CSA 704 receives four operands C<31:16>, C<15:1>, S<31:16>, and S<15:0> from the carry C<31:0> and the save S<31:0> of the 32-bit CSA 702 if 16-bit addition is being performed, and generates carry C1<15:1> and save S1<15:0>. The 16-bit CSA 704 comprises 16 4:2 compressors 704-0 through 704-15. Each of the 4:2 compressors, represented as 704-n, receives as inputs C<n>, S<n> except that of C<0> which instead receives a logic zero, and generates the carry C1<n> and save S1<n>. The carry of compressor 704-n is allowed to carry to the first compressor 704-0 except under certain circumstances with regard to modulo $2^n$ addition, as will be explained further below.

The 8-bit CSA 706 receives four operands C1<15:8>, C1<7:1>, S1<15:8>, and S1<7:0> from the carry C1<15:1> and the save S1<15:0> of the 16-bit CSA 704 if 8-bit addition is being performed, and generates carry C2<7:1> and save S2<7:0>. The 8-bit CSA 706 comprises eight 4:2 compressors 706-0 through 706-7. Each of the 4:2 compressors, represented as 706-n, receives as inputs C1<n>, S1<n> except that of C1<0> which instead receives a logic zero, and generates the carry C2<n> and save S2<n>. The carry of compressor 706-n is allowed to carry to the first compressor 706-0 except under certain circumstances with regard to modulo $2^n$ addition, as will be explained further below.

The six inputs to the 6-input/2-output multiplexer 708 include {24'hffffff, C2<7:1>, C<32>}, {16'hffff, C1<15:1>, C<32>}, {C<31:1>, C<32>}, {24'h0, S2<7:0>}, {16'h0, S1<15:0>}, and S<31:0>. If 32-bit addition is being performed, the multiplexer 708 selects as its outputs C<31:0> and S<31:0>. If 16-bit addition is being performed, the multiplexer 708 selects as its outputs {16'hffff, C1<15:1>, C<32>} and {16'h0, S1<15:0>}. If 8-bit addition is being performed, the multiplexer 708 selects as its outputs {24'hffffff, C2<7:1>, C<32>} and {24'h0, S2<7:0>}.

The outputs of the multiplexer 708 are applied in parallel to the respective inputs of the first and second 32-bit adders 710 and 712. The first 32-bit adder 710 has a logic zero as a carry-in $C_{in}$. The carry-out $C_{out}$ of the first 32-bit adder 710 controls the multiplexers 714, 716, and 718 in a manner that if the carry-out $C_{out}$ is asserted, the multiplexers 714, 716, and 718 select the corresponding sum_1 input, otherwise it selects the corresponding sum_0 input. The first 32-bit adder generates the sum_0 output, which is applied to the corresponding inputs of multiplexers 714, 716, and 718 if 8-bit, 16-bit, or 32-bit addition respectively is performed.

The second 32-bit adder 712 has a logic one as a carry-in $C_{in}$, and generates the sum_1 output, which is applied to the corresponding inputs of multiplexers 714, 716, and 718 if 8-bit, 16-bit, or 32-bit addition respectively is performed. The outputs of the multiplexers 714, 716, and 718 are applied to the inputs of the 3-input/1-output multiplexer 720. If 8-bit addition is being performed, the multiplexer 720 selects as its output the output of multiplexer 714. If 16-bit addition is being performed, the multiplexer 720 selects as its output the output of multiplexer 716. If 32-bit addition is being performed, the multiplexer 720 selects the output of multiplexer 718. The output of the multiplexer 720 is the result Z<31:0> of the modulo $2^n$ or modulo $2^n-1$ addition of the input operands. The following explains, in more detail, the various additions and operands that the modulo logic device 700 performs.

Figure 8:
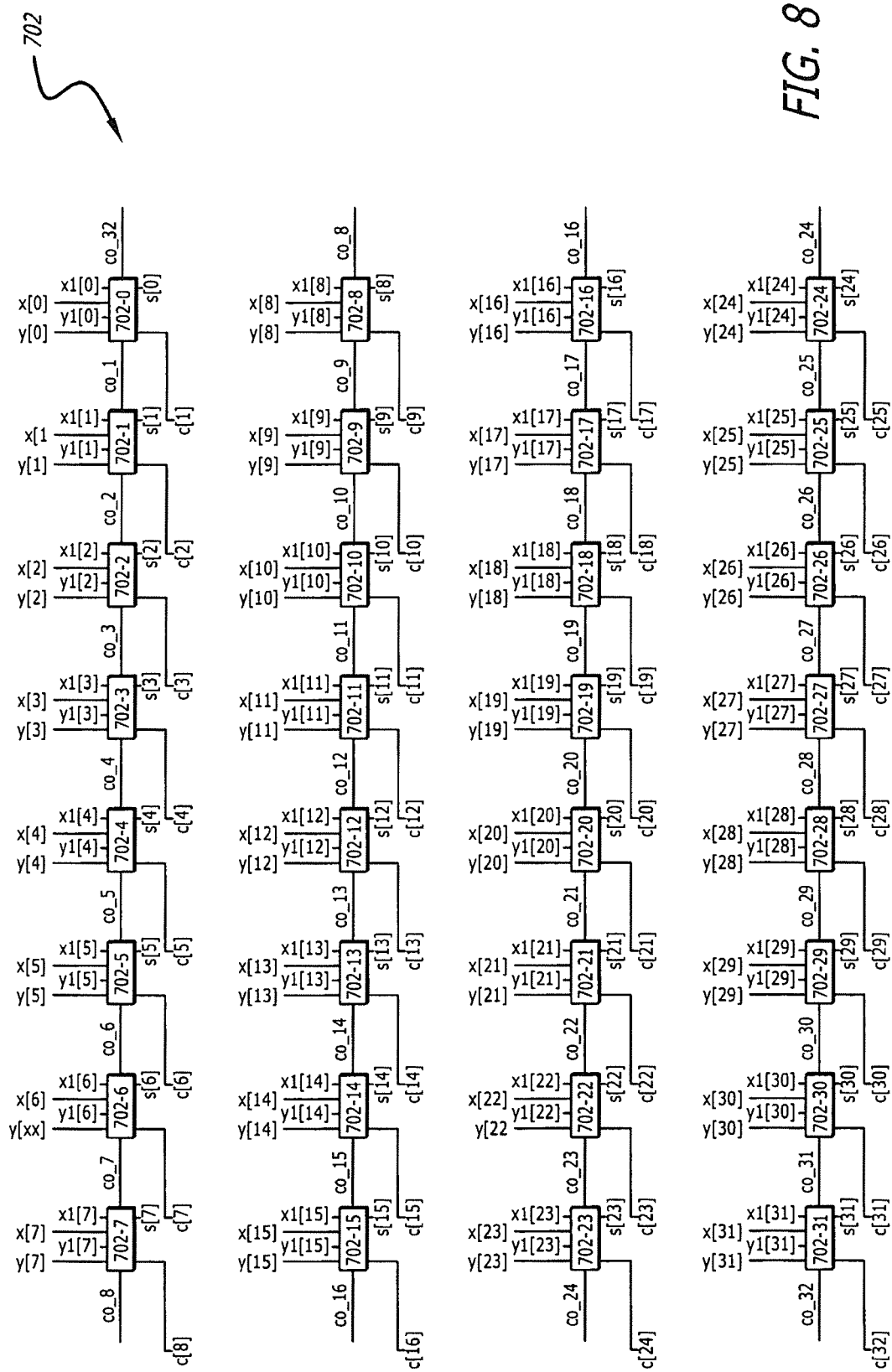
FIG. 8 illustrates an exemplary block diagram of a 32-bit carry-save adder (CSA) in accordance with an embodiment of the invention.

FIG. 8 illustrates an exemplary block diagram of a 32-bit carry-save adder (CSA) 702 in accordance with an embodiment of the invention. As previously discussed with reference to FIG. 7, the 32-bit CSA 700 comprises 32 4:2 compressors 702-0 sequentially through 702-31. The inputs to the 4:2 compressor 702-*n* includes operands y[n], y1[n], x[n], and x1[n]. The 4:2 compressor 702-*n* generates carry c[n] and save s[n]. The carry-out co_<n+1> of 4:2 compressor 702-*n* is coupled to the carry-in of 4:2 compressor 702-<n+1>, except that of compressor 702-31 whose carry-out is coupled to the carry-in of 4:2 compressor 702-0.

Figure 9:
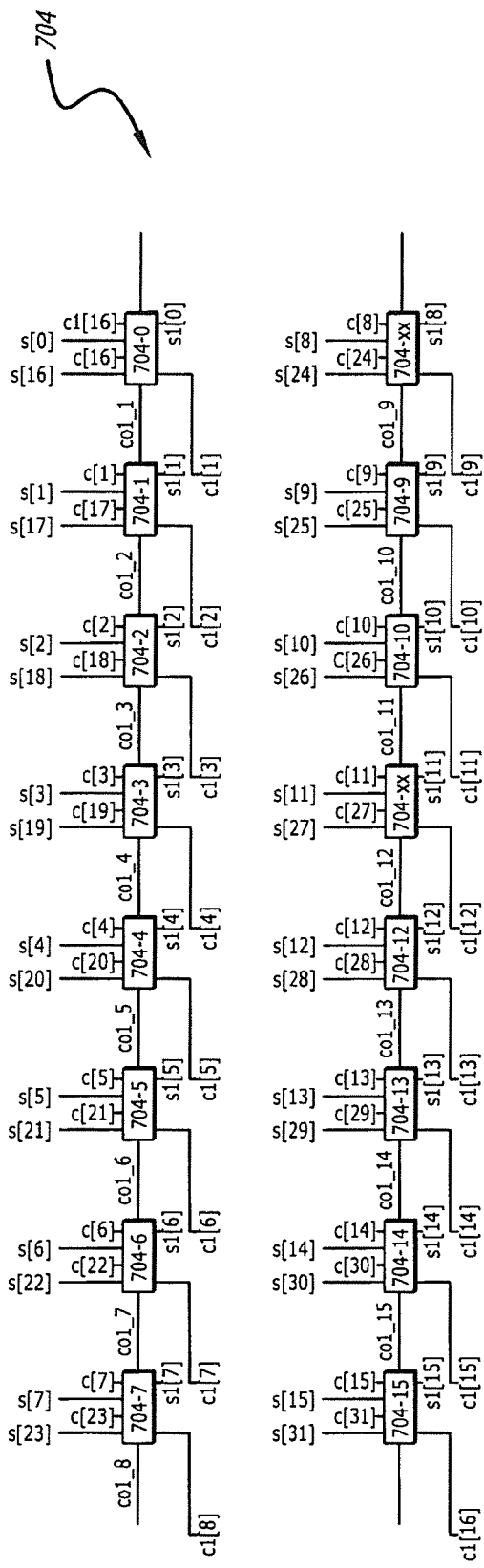
FIG. 9 illustrates an exemplary block diagram of a 16-bit CSA in accordance with an embodiment of the invention.

FIG. 9 illustrates an exemplary block diagram of a 16-bit carry-save adder (CSA) 704 in accordance with an embodiment of the invention. As previously discussed with reference to FIG. 7, the 16-bit CSA 704 comprises 16 4:2 compressors 704-0 sequentially through 704-15. The inputs to the 4:2 compressor 704-n include the output carry and save from the 32-bit CSA 702, such as s<n+16>, c<n+16>, s<n>, and c<n> except the first compressor 704-0 which has as inputs c<16>, s<16>, s<0>, and co1<16> from the carry out of the last compressor 704-15. The 4:2 compressor 704-*n* generates carry c1<n> and save s1<n>. The carry-out co1_<n+1> of 4:2 compressor 704-*n* is coupled to the carry-in of 4:2 compressor 704-<n+1>, except that of compressor 704-15 whose carry-out co1__16 is coupled to the carry-in of 4:2 compressor 704-0.

Figure 10:
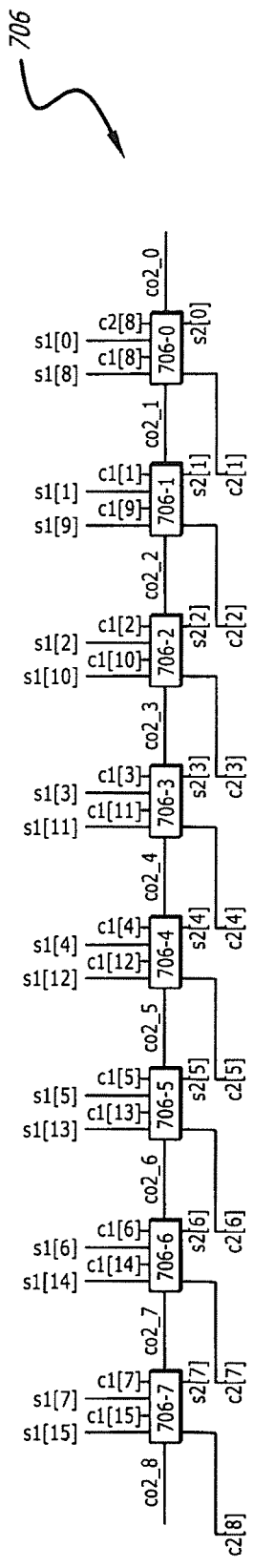
FIG. 10 illustrates an exemplary block diagram of a 8-bit CSA in accordance with an embodiment of the invention.

FIG. 10 illustrates an exemplary block diagram of a 8-bit carry-save adder (CSA) 706 in accordance with an embodiment of the invention. As previously discussed with reference to FIG. 7, the 8-bit CSA 706 comprises eight (8) 4:2 compressors 706-0 sequentially through 706-7. The inputs to the 4:2 compressor 706-*n* include the output save and carry from the 16-bit CSA 702, namely s1<n+8>, c1<n+8>, s1<n>, and c1<n> except the first compressor 706-0 which has as inputs s1<8>, c1<8>, s1<0>, and c2<8> from the carry of the last compressor 706-7. The 4:2 compressor 706-*n* generates carry c1<n> and save s1<n>. The carry-out co2_<n+1> of 4:2 compressor 706-*n* is coupled to the carry-in of 4:2 compressor 706-<n±1>, except that of compressor 706-7 whose carry-out co2__8 is coupled to the carry-in of 4:2 compressor 706-0.

II-A 32-bit Operands Modulo $2^n$ Addition

With reference to the table illustrated in FIG. 11, if the 32-bit operands $X_0$[31:0], $X_1$[31:0], $Y_0$[31:0], and $Y_1$[31:0] are applied to the 32-bit CSA 702, the carry-out co__32 of the last 4:2 compressor 702-31 does not propagate to the carry-in of the first 4:2 compressor 702-0. In addition, the carry C<32> of the last 4:2 compressor does not propagate to the multiplexer 708. Since this is a 32-bit operation, the multiplexer 708 selects as its outputs the carry C<31:1> and save S<31:0>. Accordingly, the carry C<31:1> and save S<31:0> are summed by the first adder 710 to generate sum__0. The second adder 712 is ignored in modulo $2^n$ addition. The multiplexer 718 selects as its output the sum__0 for modulo $2^n$ addition. Since, again this is a 32-bit operation, the multiplexer 720 selects the output of the multiplexer 718. The output of the multiplexer 720 is the modulo $2^n$ addition of the operands $X_0$[31:0], $X_1$[31:0], $Y_0$[31:0], and $Y_1$[31:0].

II-B 32-bit Operands Modulo $2^n-1$ Addition

In the case of modulo $2^n-1$ addition of 32-bit operands $X_0$[31:0], $X_1$[31:0], $Y_0$[31:0], and $Y_1$[31:0], the carry-out of the last compressor 4:2 702-31 of the 32-bit CSA propagates to the carry-in of the first 4:2 compressor 702-0. In addition, the carry C[32] of the last 4:2 compressor 702-31 propagates to the multiplexer 708. Since this is a 32-bit operation, the multiplexer 708 selects as its outputs the {C<31:1>, C<32>} and save S<31:0>. Accordingly, the {C<31:1>, C<32>} and S<31:0> are summed by both the first and second adders 710 and 712 to generate respectively sum__0 and sum__1. If the carry out $C_{out}$ of the first adder 710 is a logic one, the multiplexer 718 selects as its output the sum__1, otherwise it selects the sum__0. Since, again this is a 32-bit operation, the multiplexer 720 selects the output of the multiplexer 718. The output of the multiplexer 720 is the modulo $2^n-1$ addition of the operands $X_0$[31:0], $X_1$[31:0], $Y_0$[31:0], and $Y_1$[31:0].

II-C 16-bit Operands Modulo $2^n$ Addition

With reference to the table illustrated in FIG. 11, if eight (8) 16-bit operands $X_0$[15:0], $X_0$[31:16], $X_1$[15:0], $X_1$[31:16], $Y_0$[15:0], $Y_0$[31:16], $Y_1$[15:0], and $Y_1$[31:16] are applied to the 32-bit CSA 702, the carry-outs c__16 and co__32 of the 16$^{th}$ and last 4:2 compressors 702-15 and 702-31 do not propagate respectively to the carry-ins of the 17$^{th}$ and first 4:2 compressors 702-16 and 702-0. In addition, the carrys C<16> and C<32> generated by the 16$^{th}$ and last compressors 702-15 and 702-31 do not propagate to an input of the first compressor 704-0 of the 16-bit CSA 704 and to the multiplexer 708, respectively.

The carries C<31:16> and C<15:1,0> and saves S<31:16> and S<15:0> generated by the 32 bit- CSA 702 are applied to the 16-bit CSA 704, which generates carry C1<15:1,0> and save S1<15:0>. As shown in the table illustrated in FIG. 12, the carry-out co1__16 and carry C1<16> of the last 4:2 compressor 704-15 do not propagate to the first 4:2 compressor 704-0.

Since this is a 16-bit operation, the multiplexer 708 selects as its outputs the {16'hffff, C1<15:1>, C<32>} and {16'h0, S1<15:0>}. Accordingly, the {16'hffff, C1<15:1>, C<32>} and {16'h0, S1<15:0>} are summed by the first adder 710 to generate sum__0. The second adder 712 is ignored in modulo $2^n$ addition. The multiplexer 716 selects as its output the sum__0<15:0> for modulo $2^n$ addition. Since, again this is a 16-bit operation, the multiplexer 720 selects the output of the multiplexer 716. The output of the multiplexer 720 is the modulo $2^n$ addition of the operands $X_0$[15:0], $X_0$[31:16], $X_1$[15:0], $X_1$[31:16], $Y_0$[15:0], $Y_0$[31:16], $Y_1$[15:0], and $Y_1$[31:16].

II-D 16-bit Operands Modulo $2^n-1$ Addition

In the case of Modulo $2^n-1$ addition of eight (8) 16-bit operands $X_0$0[15:0], $X_0$[31:16], $X_1$[15:0], $X_1$[31:16], $Y_0$[15: 0], $Y_0$[31:16], $Y_1$[15:0], and $Y_1$[31:16], the carry-outs co__16 and co__32 of the 16$^{th}$ and last 4:2 compressors 702-15 and 702-31 propagate respectively to the carry-ins of the 17$^{th}$ and first 4:2 compressors 702-16 and 702-0. In addition, the carries c<16> and c<31> generated by the 16$^{th}$ and last compressors 702-15 and 702-31 propagate to an input of the first compressor 704-0 of the 16-bit CSA 704 and to the multiplexer 708, respectively.

The carries C<31:16> and C<15:1,0> and saves S<31:16> and S<15:0> generated by the 32-bit CSA 702 are applied to the 16-bit CSA 704, which generates carry C1<15:1,0> and save S1<15:0>. The carry-out co1__16 and carry c1<16> of the last 4:2 compressor 704-15 propagate to the carry-in and input of the first 4:2 compressor 704-0 in modulo $2^n-1$ addition.

Since this is a 16-bit operation, the multiplexer 708 selects as its outputs the {16'hffff, C1<15:1>, C<32>} and {16'h0, S1<15:0>}. Accordingly, the {16'hffff, C1<15:1>, C<32>} and {16'h0, S1<15:0>} are summed by the first and second adders 710 and 712 to generate respectively sum_0<15:0> and sum_1<15:0>. If the carry out $C_{out}$ of the first adder 710 is a logic one, the multiplexer 716 selects as its output the sum_1<15:0>, otherwise it selects the sum_0<15:0>. Since, again this is a 16-bit operation, the multiplexer 720 selects the output of the multiplexer 716. The output of the multiplexer 720 is the modulo $2^n-1$ addition of the operands $X_0[15:0]$, $X_0[31:16]$, $X_1[15:0]$, $X_1[31:16]$, $Y_0[15:0]$, $Y_0[31:16]$, $Y_1[15:0]$, and $Y_1[31:16]$.

II-E 8-bit Operands Modulo $2^n$ Addition

With reference to the table illustrated in FIG. 11, if the 16 8-bit operands $X_0[7:0]$, $X_0[15:8]$, $X_0[23:16]$, $X_0[31:24]$, $X_1[7:0]$, $X_1[15:8]$, $X_1[23:16]$, $X_1[31:24]$, $Y_0[7:0]$, $Y_0[15:8]$, $Y_0[23:16]$, $Y_0[31:24]$, $Y_1[7:0]$, $Y_1[15:8]$, $Y_1[23:16]$, and $Y_1[31:24]$ applied to the 32-bit CSA 702 are to be modulo $2^n$ added, the carry-outs c0_8, c0_16, co_24 and co_32 of 4:2 compressors 702-7, 702-15, 702-23, and 702-31 do not propagate respectively to the carry-ins of 4:2 compressors 702-8, 702-16, 702-24, and 702-0. In addition, the carries c<8>, c<16>, c<24>, and c<32> of respectively 4:2 compressors 702-7, 702-15, 702-23, and 702-31 do not propagate respectively to the inputs to the 4:2 compressors 704-8, 704-0 and 704-8, and multiplexer 708.

The carries C<7:1, 0>, C<15:8>, C<23:16> and C<31:24>, and saves S<7:0>, S<15:8>, S<23:16> and S<31:24> are applied to the 16-bit CSA 704, which generates carries C1<7:1,0> and C1<15:8> and saves S1<7:0> and S1<15:8>. With reference to the table illustrated in FIG. 12, the carry-outs co1_8 and co1_16 of 4:2 compressors 704-7 and 704-15 do not propagate respectively to 4:2 compressors 704-8 and 704-0. In addition, the carrys c1<8> and c1<16> of the 4:2 compressors 704-7 and 704-16 do not propagate respectively to 4:2 compressors 706-0 and 704-0.

The carries C1<7:1,0> and C1<15:8> and saves S1<7:0> and S1<15:8> are applied to the 8-bit CSA 706, which generates carry C2<7:1,0> and save S2<7:0>. With reference to the table illustrated in FIG. 13, the carry-out co2_8 and carry c2<8> of the last 4:2 compressor 706-7 do not propagate to the carry-in and input of the first compressor 706-0.

Since this is an 8-bit operation, the multiplexer 708 selects as its outputs the {24'hffff, c2<7:1>, c<32>} and {24'h0, S2<7:0>}. Accordingly, the {24'hffff, c2<7:1>, c<32>} and {24'h0, S2<7:0>} are summed by the first adder 710 to generate sum_0<7:0>. The second adder 712 is ignored in modulo $2^n$ addition. The multiplexer 714 selects as its output the sum_0<7:0> for modulo $2^n$ addition. Since, again this is an 8-bit operation, the multiplexer 720 selects as its output the output of the multiplexer 714. The output of the multiplexer 720 is the modulo $2^n$ addition of the operands $X_0[7:0]$, $X_0[15:8]$, $X_0[23:16]$, $X_0[31:24]$, $X_1[7:0]$, $X_1[15:8]$, $X_1[23:16]$, $X_1[31:24]$, $Y_0[7:0]$, $Y_0[15:8]$, $Y_0[23:16]$, $Y_0[31:24]$, $Y_1[7:0]$, $Y_1[15:8]$, $Y_1[23:16]$, and $Y_1[31:24]$.

II-F 8-bit Operands Modulo $2^n-1$ Addition

In the case of Modulo $2^n-1$ addition of 16 8-bit operands $X_0[7:0]$, $X_0[15:8]$, $X_0[23:16]$, $X_0[31:24]$, $X_1[7:0]$, $X_1[15:8]$, $X_1[23:16]$, $X_1[31:24]$, $Y_0[7:0]$, $Y_0[15:8]$, $Y_0[23:16]$, $Y_0[31:24]$, $Y_1[7:0]$, $Y_1[15:8]$, $Y_1[23:16]$, and $Y_1[31:24]$, the carry-outs co_8, co_16, co_24, and co_32 of 4:2 compressors 702-7, 702-15, 702-23, and 702-31 do propagate respectively to the carry-ins of 4:2 compressors 702-8, 702-16, 702-24 and 702-0. Also, the carries c<8>, c<16>, c<24>, and c<32> do propagate respectively to the inputs of 4:2 compressors 704-8, 704-0, and 704-8, and to multiplexer 708.

The carries C<7:1, 0>, C<15:8>, C<23:16> and C<31:24>, and saves S<7:0>, S<15:8>, S<23:16> and S<31:24> are applied to the 16-bit CSA 704, which generates carries C1<7:1,0> and C1<15:8> and saves S1<7:0> and S1<15:8>. With reference to the table illustrated in FIG. 12, the carry-outs co1_8 and co1_16 of 4:2 compressors 704-7 and 704-15 do propagate to 4:2 compressors 704-8 and 704-0. The carries C1<7:1,0> and C1<15:8> and saves S1<7:0> and S1<15:8> are applied to the 8-bit CSA 706, which generates carry C2<7:1,0> and save S2<7:0>. With reference to the table illustrated in FIG. 13, the carry-out co2_8 and carry c2<8> of the last 4:2 compressor 706-7 do propagate to the inputs of 4:2 compressor 706-0. The carry C2<7:1,0> and save S2<7:0> are applied to the multiplexer 708.

Since this is an 8-bit operation, the multiplexer 708 selects as its outputs the {24'hffff, c2<7:1>, c<32>}, and {24'h0, S2<7:0>}. Accordingly, the {24'hffff, c2<7:1>, c<32>}, and {24'h0,S2<7:0>} are summed by the first and second adders 710 and 712 to generate respectively sum_0<7:0> and sum_0<7:0>. If the carry out $C_{out}$ of the first adder 710 is a logic one, the multiplexer 714 selects as its output the sum_1<7:0>, otherwise it selects the sum_0<7:0>. Since, again this is an 8-bit operation, the multiplexer 720 selects as its output the output of the multiplexer 714. The output of the multiplexer 720 is the modulo $2^n$ addition of the operands $X_0[7:0]$, $X_0[15:8]$, $X_0[23:16]$, $X_0[31:24]$, $X_1[7:0]$, $X_1[15:8]$, $X_1[23:16]$, $X_1[31:24]$, $Y_0[7:0]$, $Y_0[15:8]$, $Y_0[23:16]$, $Y_0[31:24]$, $Y_1[7:0]$, $Y_1[15:8]$, $Y_1[23:16]$, and $Y_1[31:24]$.

II-G Conclusion—Modulo $2^n$/Modulo $2^n-1$ Addition

The modulo logic device 700 enables practical realization of implementing the SMAD/ESMAD functions. In the prior art, achieving the SMAD/ESMAD functions is typically done by executing a series of instruction by a processor. These instructions include a number of adds and logical operations, which can consume several to many clock processor cycles. The modulo logic device 700 can perform the SMAD/ESMAD functions within one or two processor cycles for substantial speedup in performance over executing instructions.

In the foregoing specification, this disclosure has been described with reference to specific embodiments thereof. It will, however, be evident that various modifications and changes may be made thereto without departing from the broader spirit and scope of the embodiments of the embodiments of the invention. The specification and drawings are, accordingly, to be regarded in an illustrative rather than a restrictive sense.

It is claimed:

1. A method comprising:
receiving an instruction identifying a result register, identifying a first source register storing a first operand, identifying a second operand, and identifying a start bit position; and
in response to receiving the instruction, causing a logic device to add a first data field of the first operand which begins at the identified start bit position of the first operand to a second data field of the second operand which begins at a least significant bit of the second operand, and to store a result of the addition in a third data field of the result register which begins at the identified start bit position in the result register, and to store a fourth data field of the first operand which begins at a least significant bit of the first operand and which ends just before the identified start bit position of the first operand to a fifth data field of the result register which begins at a least significant bit of the result register.

2. The method of claim 1, wherein receiving comprises receiving the instruction having one or more bits to indicate that the addition affects only a bit field of the first operand.

3. The method of claim 1, wherein receiving comprises receiving the instruction that identifies a stop bit position.

4. The method of claim 3, wherein the instruction causes the logic device to add the first data field of the first operand which ends at the identified stop bit position of the first operand to the second data field of the second operand which ends at a bit that is one bit more significant than a difference between the stop bit position and the start bit position, and causes the logic device to copy bits of the first operand more significant than the stop bit position of the first operand to bits of the result register more significant than the identified stop bit position.

5. The method of claim 1, wherein causing the logic device to add comprises causing the logic device to add the first data field of the first operand to the second data field of the second operand by using a mask, the mask having a string of most significant bits that are set and a string of least significant bits that are cleared, where lengths of the string of the most significant bits that are set and the string of the least significant bits that are cleared are based at least in part on the identified start bit position.

6. The method of claim 5, wherein the lengths of the string of the most significant bits that are set and the string of the least significant bits that are cleared are also based on the identified stop bit position.

7. The method of claim 1, wherein receiving comprises receiving the instruction having a $2^n-1$ modulo parameter, and wherein causing the logic device to add the first data field of the first operand to the second data field of the second operand comprises causing the logic device to perform a $2^n-1$ modulo addition.

8. The method of claim 1, wherein receiving comprises receiving the instruction having a parameter to indicate that the addition is to be performed with carry in, and wherein causing the logic device to add comprises causing the logic device to add the first data field of the first operand to the second data field of the second operand and to a carry in.

9. The method of claim 1, wherein receiving the instruction identifying the start bit position comprises receiving the instruction having a field specifying the start bit position.

10. An apparatus comprising:
a result register;
a first source register to store a first operand;
an instruction control device to receive an instruction, the instruction to identify the result register, to identify the first source register, to identify a second operand, and to identify a start bit position; and
a logic device coupled with the instruction control device, the logic device responsive to the instruction to add a first data field of the first operand which begins at the identified start bit position of the first operand to a second data field of the second operand which begins at a least significant bit of the second operand, and to store a result of the addition in a third data field of the result register which begins at the identified start bit position in the result register, and to store a fourth data field of the first operand which begins at a least significant bit of the first operand and which ends just before the identified start bit position of the first operand to a fifth data field of the result register which begins at a least significant bit of the result register.

11. The apparatus of claim 10, wherein the instruction control device is to receive the instruction having one or more bits to indicate that the addition is to affect only a bit field of the first operand.

12. The apparatus of claim 10, wherein the instruction control device is to receive the instruction that identifies a stop bit position.

13. The apparatus of claim 12, wherein the logic device responsive to the instruction is to add the first data field of the first operand which ends at the identified stop bit position of the first operand to the second data field of the second operand which ends at a bit that is one bit more significant than a difference between the stop bit position and the start bit position, and to store bits of the first operand more significant than the stop bit position of the first operand to bits of the result register more significant than the identified stop bit position.

14. The apparatus of claim 10, wherein the logic device responsive to the instruction is to add the first data field of the first operand to the second data field of the second operand by using a mask, the mask to have a string of most significant bits that are to be set and a string of least significant bits that are to be cleared, where lengths of the string of the most significant bits that are to be set and the string of the least significant bits that are to be cleared are to be based at least in part on the identified start bit position.

15. The apparatus of claim 14, wherein the lengths of the string of the most significant bits that are to be set and the string of the least significant bits that are to be cleared are also to be based on a stop bit position identified by the instruction.

16. The apparatus of claim 10, wherein the instruction control device is to receive the instruction having a $2^n-1$ modulo parameter, and wherein the logic device responsive to the instruction is to perform a $2^n-1$ modulo addition.

17. The apparatus of claim 10, wherein the instruction control device is to receive the instruction having a parameter to indicate that the addition is to be performed with carry in, and wherein the logic device responsive to the instruction is to add the first data field of the first operand to the second data field of the second operand and to a carry in.

18. The apparatus of claim 10, wherein the instruction control device is to receive the instruction having a field to specify the start bit.

19. The apparatus of claim 10, wherein the second operand comprises an immediate.

20. The apparatus of claim 10, wherein the instruction has a control parameter to indicate that the addition is to be performed with a carry in and has a control parameter to indicate that the addition is to be performed modulo $2^n-1$.

21. A processor comprising:
an instruction control device to receive an instruction, the instruction to identify a first operand, to identify a second operand, and to identify a start bit position; and
a logic device coupled with the instruction control device, the logic device responsive to the instruction to add a first data field of the first operand which is to begin at the identified start bit position of the first operand to a second data field of the second operand which is to begin at a least significant bit of the second operand, and to store a result of the addition in a third data field of a result operand which is to begin at the identified start bit position in the result operand, and to store a fourth data field of the first operand which is to begin at a least significant bit of the first operand and which is to end just before the identified start bit position of the first operand to a fifth data field of the result operand which is to begin at a least significant bit of the result operand.

22. The processor of claim 21, wherein the instruction control device is to receive the instruction that is to have one or more bits to indicate that the addition is to affect only a bit field of the first operand.

23. The processor of claim 21, wherein the instruction control device is to receive the instruction that is to identify a stop bit position, and wherein the logic device responsive to the instruction is to add the first data field of the first operand which is to end at the identified stop bit position of the first operand to the second data field of the second operand which is to end at a bit that is one bit more significant than a difference between the stop bit position and the start bit position, and is to store bits of the first operand more significant than the stop bit position of the first operand to bits of the result operand more significant than the identified stop bit position.

24. The processor of claim 21, wherein the logic device responsive to the instruction is to add the first data field of the first operand to the second data field of the second operand by using a mask, the mask to have a string of most significant bits that are to be set and a string of least significant bits that are to be cleared, where lengths of the string of the most significant bits that are to be set and the string of the least significant bits that are to be cleared are to be based at least in part on the identified start bit position.

25. The processor of claim 21, wherein the instruction control device is to receive the instruction that is to have an immediate to identify the start bit position.

26. The processor of claim 21, wherein the instruction control device is to receive the instruction that is to have a parameter to indicate that the addition is to be performed with carry in, and wherein the logic device responsive to the instruction is to add the first data field of the first operand to the second data field of the second operand and to a carry in.

27. The processor of claim 21, wherein the instruction control device is to receive the instruction that is to have a $2^n-1$ modulo parameter, and wherein the logic device responsive to the instruction is to perform a $2^n-1$ modulo addition.

28. The processor of claim 21, wherein the second operand comprises an immediate.

29. The processor of claim 21, wherein the instruction has a control parameter to indicate that the addition is to be performed with a carry in and has a control parameter to indicate that the addition is to be performed modulo $2^n-1$.

* * * * *